G. LETTENMYER.
Harrow.
No. 214,671. Patented April 22, 1879.
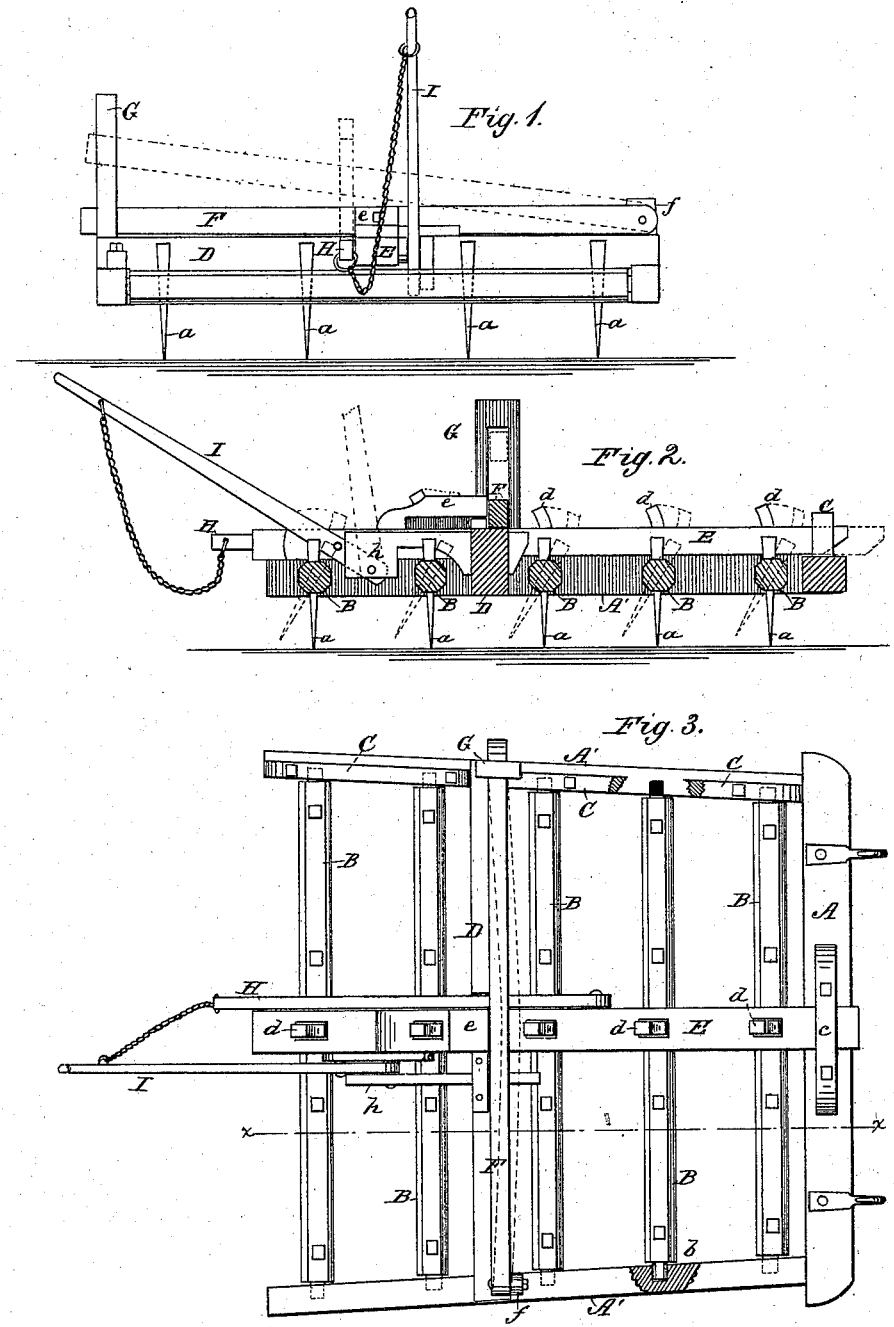
WITNESSES:
W. W. Hollingsworth
Edw. W. Byrn.
INVENTOR:
Geo. Lettenmyer
BY
ATTORNEYS.

UNITED STATES PATENT OFFICE.

GEORGE LETTENMYER, OF LITTLE GEORGETOWN, ASSIGNOR TO HIMSELF, FRANK BLAKE, OF SAME PLACE, AND JOHN M. McALLISTER, OF TOMAHAWK SPRINGS, WEST VIRGINIA.

IMPROVEMENT IN HARROWS.

Specification forming part of Letters Patent No. 214,671, dated April 22, 1879; application filed February 7, 1879.

*To all whom it may concern:*

Be it known that I, GEORGE LETTENMYER, of Little Georgetown, in the county of Berkeley and State of West Virginia, have invented a new and Improved Harrow; and I do hereby declare that the following is a full, clear, and exact description of the same, reference being had to the accompanying drawings, forming part of this specification, in which—

Figure 1 is a rear edge view. Fig. 2 is a vertical section through the line $x\ x$ of Fig. 3, and Fig. 3 is a plan view.

My invention relates to certain improvements in harrows designed to render the draft of the implement easier to the team, to render the harrow-teeth yielding to obstruction, and to permit the teeth to be inclined to the rear, to diminish the draft and avoid tearing up the ground when transporting the harrow over roads or ground which it is desired to keep unbroken.

The invention is an improvement upon that form of harrow in which a series of pivoted rake-bars having teeth are arranged parallel to the line of draft, and are loosely connected to a right angular reversing-bar.

The improvement consists of a single spring-bar and a reversing-bar, loosely connected with all of the pivoted parallel bars, so that the same spring operates upon them all; and also in the particular means for manipulating the spring-bar and reversing-bar, as hereinafter more fully described.

In the drawings, A A' A' represent three marginal beams, which are connected together by mortise joints to constitute the framework. Of these bars, A is the front one, and is provided with draft-connections for the team. Between the side beams, A' A', are arranged the removable harrow-bars B, having gudgeons in their end, which oscillate in bearings in the side bars, and provided also with harrow-teeth $a$. These bars B are arranged parallel to each other and lateral to the line of draft. They are held in place by holes $b$, bored in one side bar to receive the gudgeons at one end, and by slotted bearings at the other, into which the gudgeons of the other ends are dropped, the said gudgeons being retained by strips C, which close the open ends of the slots, and are bolted to the side beam, as shown. This permits the rake-bars to be readily removed with the teeth, for sharpening the latter, or for repairs, without the necessity of transporting the entire frame. A little in the rear of the middle of the harrow is firmly secured to the side bars a heavy head-beam, D, arranged transversely to the line of draft. Through this head-beam and a keeper, $c$, at the front end of the frame there extends at right angles to the harrow-bars the reversing-bar E. This is slotted at each of the harrow-bars, and through these slots there project arms $d$, attached to each one of the harrow-bars, so that between each of the latter and the reversing-bar there is a loose connection. This reversing-bar is made longitudinally adjustable, and carries upon its upper surface a rigid lug or shoulder, $e$. Just in front of the shoulder and above the head-beam is arranged the spring-bar F, which is pivoted at one end at $f$, and at the other end is free to rise, and is guided in such movement by the slotted bar G, through which the said end projects.

Now, when the harrow is in operation, it will be seen that the tendency is to throw the teeth of the harrow to the rear, and this effect in throwing the arms $d$ forward brings also the reversing-bar forward, and as its lug $e$ advances it presses against the middle of the spring-bar.

It will thus be seen that each of the pivoted harrow-bars is made yielding to obstruction, which not only avoids breaking the teeth in passing over stones, but prevents the jerking action upon the team and renders the draft more uniform.

In transporting the harrow, the spring-bar F is raised out of the range of the lug $e$, as shown in dotted lines in Fig. 1, and as there is nothing to resist the tendency of the harrow-bars to be turned, the reversing-bar is thrown to the front and the harrow-teeth to the rear, as shown in dotted lines in Fig. 2, in which position the teeth do not mutilate the road, but ride over the same with an easier draft. In order to enable the workman to readily lift the spring-bar to permit this adjustment, a lever, H, is provided, which is pivoted to the side of the reversing-bar, and extends at right angles beneath the spring-bar to a position where the workman can readily lift the same to release said spring-bar. When it is desired to throw the reversing-bar forward, this is effected by a lever, I, which is pivoted to said bar, and at its lower end is fulcrumed to an offset, h, projecting rearwardly from the head-beam.

Having thus described my invention, what I claim as new is—

1. A series of pivoted harrow-teeth bars, combined with a bar extending across and loosely connected with each of said bars, and a spring adapted to project said bar to the rear, substantially as described.

2. The combination of the pivoted parallel bars B, having arms d, the slotted bar E, having lug e, and the spring-bar F, as described.

3. The spring-bar F, pivoted at one end and retained in a vertical guide or keeper at the other, in combination with the slotted reversing-bar, loosely connected with the rake-bars, and a lever, H, pivoted at right angles beneath the spring-bar, substantially as shown and described.

GEORGE LETTENMYER.

Witnesses:
DANIEL FLEMING,
J. HANSON LIGHT.